Dec. 31, 1963  R. T. SAND, SR  3,115,920
VEHICLE TRACTION DEVICE
Filed Aug. 17, 1962   3 Sheets-Sheet 1
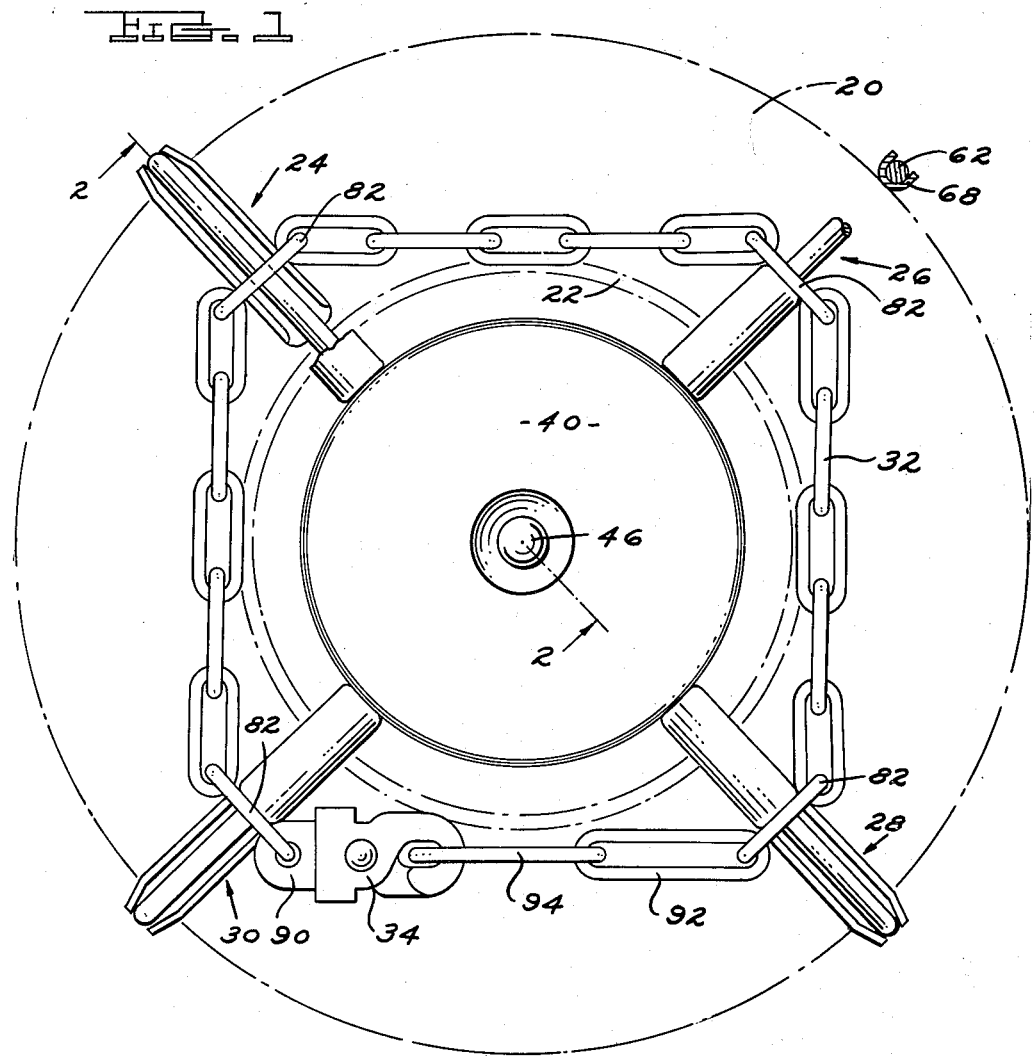
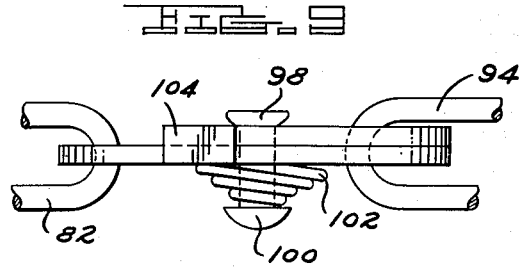
INVENTOR.
ROBERT T. SAND, SR.
BY
Barnes, Kisselle, Raisch & Choate
ATTORNEYS Dec. 31, 1963   R. T. SAND, SR   3,115,920
VEHICLE TRACTION DEVICE
Filed Aug. 17, 1962   3 Sheets-Sheet 2
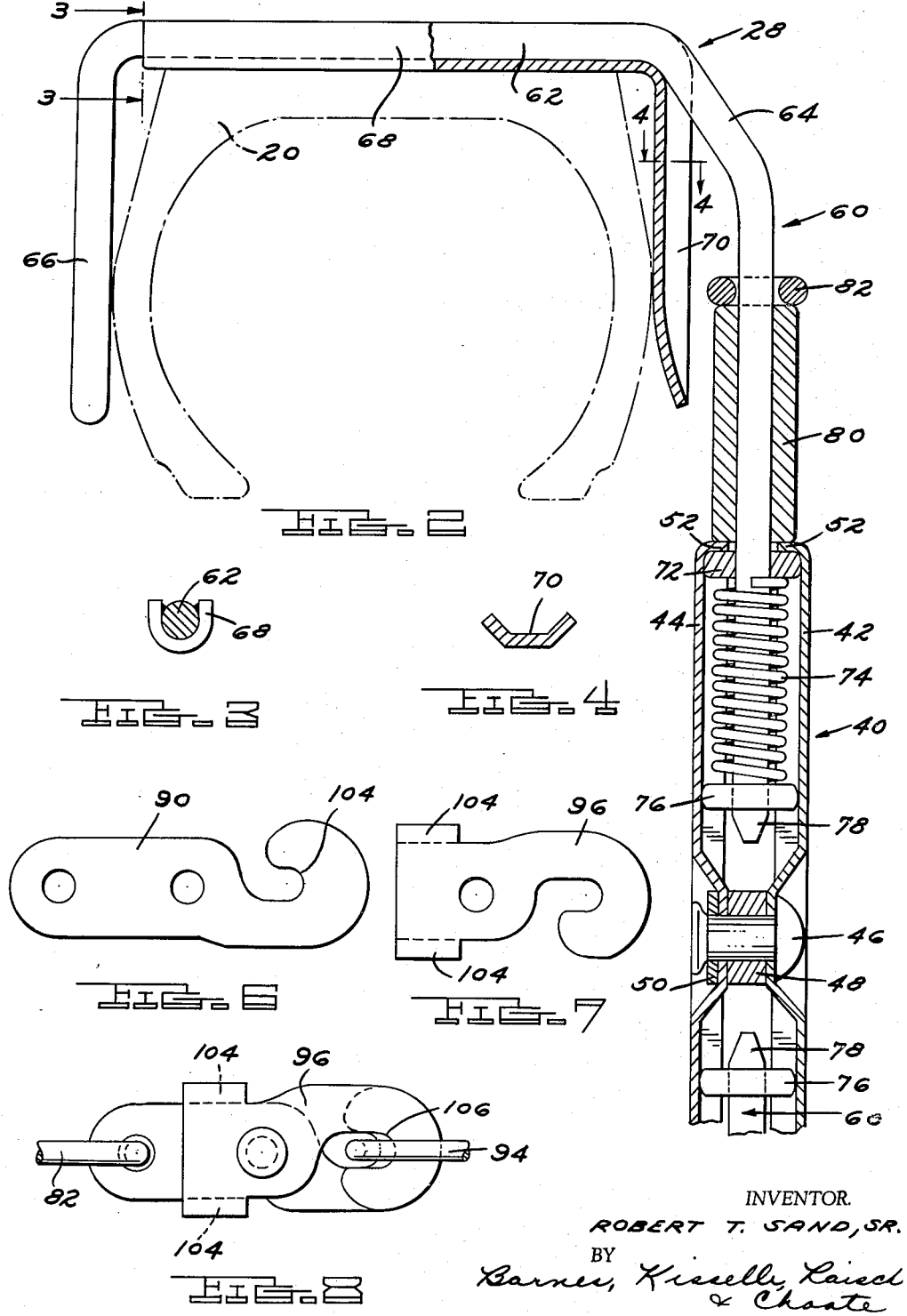
INVENTOR.
ROBERT T. SAND, SR.
BY
Barnes, Kisselle, Raisch
& Choate
ATTORNEYS Dec. 31, 1963  R. T. SAND, SR  3,115,920
VEHICLE TRACTION DEVICE
Filed Aug. 17, 1962  3 Sheets-Sheet 3
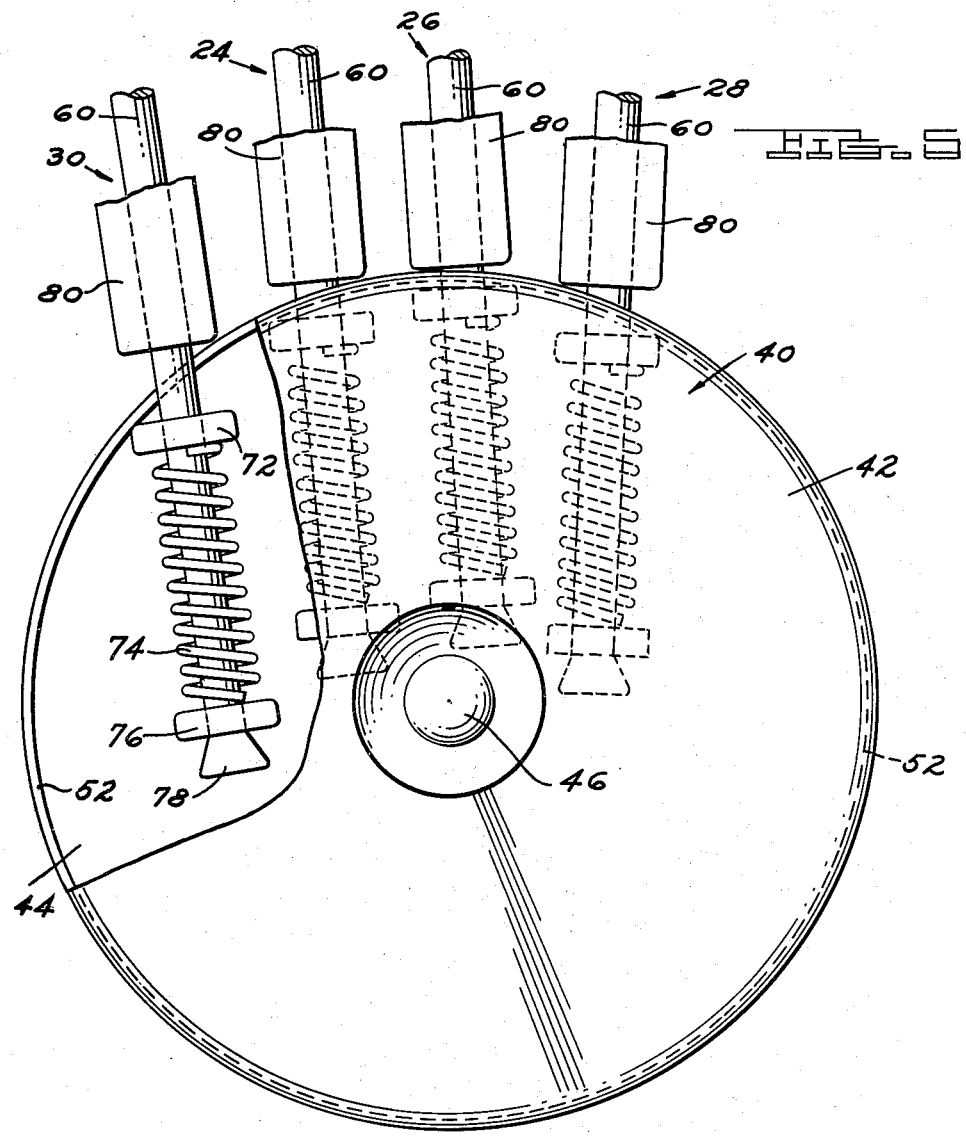
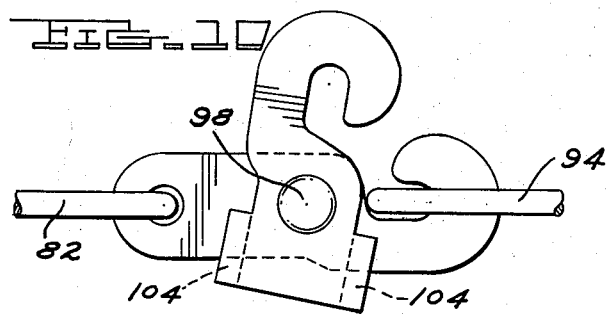
INVENTOR.
ROBERT T. SAND, SR.
BY Barnes, Kisselle,
Raisch & Choate
ATTORNEYS

# United States Patent Office 3,115,920  
Patented Dec. 31, 1963

3,115,920  
VEHICLE TRACTION DEVICE  
Robert T. Sand, Sr., 5220 McClellan, Detroit, Mich.  
Filed Aug. 17, 1962, Ser. No. 217,597  
7 Claims. (Cl. 152—218)

This invention relates to a traction device for wheeled vehicles. It has long been a problem to provide extra traction in the event a vehicle must be moved on soft or muddy ground or on snow or ice. To use chains on tires for prolonged time causes undue wear and a bumpy ride, particularly since with modern road clearing facilities, much of the pavement is kept clear even under extreme winter conditions. It is desirable, therefore, to have a device which will readily attach and detach to a tire and one which can be applied conveniently from one side of the tire without the necessity of reaching around to fasten a mechanism.

It is an object of the present invention to provide a device of this kind wherein all the parts are connected to a central holder unit in a manner such that they can be handled as a group and easily stored. It is possible then to take the device and apply it to a wheel from one side thereof by simply suspending it on one side of the wheel and moving the traction devices to spaced positions thereon followed by a locking of a spacing chain.

Another object of the device is a traction unit which will cut into hard ice if this is the surface on which the car is moving and also one which will absorb shocks where a stone is hit either squarely or on one corner of the tire.

It is a further object of the device to provide a unit which will automatically compensate for wear on the tire so that it will always be disposed in a tight position.

Other objects and features of the invention relating to details of construction and operation will be apparent in the following description and claims.

Drawings accompany the disclosure and the various views thereof may be briefly defined as:

FIGURE 1, a side elevation of a device showing assembly on a vehicle wheel.

FIGURE 2, a sectional view showing one element of the device taken on line 2—2 of FIGURE 1.

FIGURES 3 and 4, sectional views on lines 3—3 and 4—4 respectively of FIGURE 2.

FIGURE 5, a view showing the manner in which the latching arms can be disposed relative to the central disc.

FIGURE 6, a view of one element of a locking hook.

FIGURE 7, a view of a second element of the locking hook assembly.

FIGURE 8, a side view of the locking hook assembly.

FIGURE 9, a top view of the locking hook assembly.

FIGURE 10, a view of the locking hook in open position.

Referring to the drawings:

A tire 20 is shown having a central hub member 22 of standard construction. Spaced around the tire are four traction elements 24, 26, 28 and 30 shown generally disposed at 90° to each other and held captive in a flat central body unit. A chain 32 anchored on each one is disposed to span the distance between each unit, this chain being connected at a locking hook 34 to be described in detail later.

In FIGURE 2, details of the device are shown. The traction elements all extend out of a slot in a central body 40 comprising a housing formed of two identical shells 42 and 44 with inturned flanges held together centrally by a rivet 46 passing through a spacer element 48 and a hard washer 50. The housings are shaped inwardly at the center to accommodate the rivet 46 and each is flanged inwardly at 52 so that an annular slot is provided around the housing.

The traction element comprises generally a hook shaped element having a first shank end 60 with a leg 62 extending generally at right angles to the shank end connected by an angled portion 64. A return portion 66 forming the hook is disposed at right angles to the traction portion 62. An L-shaped sheet metal protector device 68 underlies and is welded to the traction portion 62 in a U-shaped cross-section as shown in FIGURE 3 and this element has a flatter cross-section 70 as shown in FIGURE 4 in a portion which overlies the side of a tire.

The shank 60 projects into, and is captive within, the annular slot of the housing 40 between flanges 52 by means of a fairly thick washer element 72, a spring 74 and a second washer element 76. These washer elements 72 and 76 are preferably formed of bronze or brass or some other material which has good frictional characteristics. The end 78 of the shank is flattened (see FIGURE 5) to retain the washer 76 and it is tapered down as shown in FIGURE 2 so that if the shank is driven down toward the center of the housing, it will not damage the side walls of the housing. Each shank 60 passes through a spacer element 80 which can be formed of aluminum, for example, or a flared steel tube which has the ends flared inwardly so that it will ride easily on the flanges 52 to a central housing 40.

The locating chain 32, as previously described, has one link 82 at spaced intervals which surrounds the respective traction elements as shown in FIGURE 1. The chain has an equal number of links between each element and the ends are connected in a manner to be locked together, the link 82 at traction element 30 being connected to a locking element 90 shown in FIGURE 6 and the other end of the chain being formed by two relatively long links 92 and 94.

The link 90 has a pivotal link 96 shown in FIGURE 7 fastened to it by a rivet 98 (FIGURE 9) which passes through the two links and has an extra length which accommodates below the head 100 a flat spring 102 which is spirally coiled to urge the head outwardly as shown in FIGURE 9. The link 96 has two flanges 104 which engage the edges of link 90 when the device is in the locked position as shown, for example, in FIGURE 9. To disengage the device, the head 100 can be pushed in to free the flanges from the body of the link 90 and allow it to turn as shown in FIGURE 10. In the locked position, it is preferable that a portion 106 at the bight of the hook 90 engage the link 94 to take the strain on the hook, thus relieving the latching element 96 from the general strain of the assembly.

In the operation, it will be seen that when the device is disassembled from the tire, the various shanks 60 of the traction device can all take the position at one side of the central body element. Thus, each can be hooked over the tire at a single place from one side of the wheel. The traction elements can then be spread out to positions approximating that shown in FIGURE 1 and the hook 34 latched to the link 94. The spring 74 provides for a certain tension of the traction elements against the tire as they are moved around and thus tends to hold them in place while permitting a motion of one shank relative to the hub, it being understood that the entire hub is floating on the wheel. When thus assembled, the device will provide an excellent traction unit which can be used to extricate a vehicle from a surface which provides less than the usual support on frictional engagement for the tire.

It will be seen that in deep snow or mud, the elements 60 and 62 will also add to the traction grip. Once the vehicle has reached the hard pavement or adequate traction surface, the device is readily removed simply by releasing the hook and slipping all of the traction elements to a position where they can be readily lifted off or slipped off the tire.

It will be seen that because of the fact that the traction elements are readily movable into the central body unit and that the shanks of the traction elements can pivot therein, the device is readily stored in a flat condition wherein all of the traction elements can be more or less parallel in a position on one side of the body unit.

What I claim is:

1. A traction device for application to traction wheels which comprises:
    (a) a relatively flat, central body unit,
    (b) a plurality of traction elements having a first end captive in said body but movable circumferentially and another end extending outwardly and at a direction substantially normal to the first end and movable to a position parallel with or normal to the plane of said body, and
    (c) tension means positively located radially on said first ends to operatively connect said respective traction elements to effect circumferential spacing thereof when applied to a wheel.

2. A traction device as defined in claim 1 in which the central body unit comprises parallel circular plates fastened together centrally and spaced at the periphery thereof to provide a peripheral slot around the housing.

3. A traction device as defined in claim 1 in which the first end of the traction elements has an enlarged portion trapping it within a peripheral slot in said body and resilient means interposed between said enlarged portion and an interior wall of said housing to exert resilient pressure on said first end against pressure tending to move said end out of said body.

4. A traction device as defined in claim 1 in which the tension means comprises a chain having a plurality of links at spaced intervals on the chain passing around and transfixed by said traction elements and means to engage the ends of said chain between two of said traction elements to space said elements substantially equally and circumferentially around a traction wheel.

5. A traction device as defined in claim 1 in which the central body unit comprises a housing having a circumferential slot with an annular space within said housing, and said first ends of said traction elements projecting into said annular space, retaining means on said first ends of said traction elements separated by a resilient member, the retaining means adjacent the tip end of said first end being fixed to serve as an anchor for said spring and the retaining means at the other end of said spring being slidable on said traction elements to provide a resilient anchor for said first end.

6. A traction device for application to a tire and wheel assembly of a track vehicle which comprises:
    (a) a relatively flat central body unit formed of two identical stampings each having an inturned flange, said stampings being mounted in spaced relation with said flanges directed toward each other but spaced to leave an annular slot outside a toroidal opening within said body,
    (b) a plurality of traction elements mounted on said body having a first end resiliently captive within said toroidal opening and retained by said flanges and a second end movable into and at any angle to the plane of said body unit, said second ends of said traction elements being positionable axially across the periphery of a tire to which the device is applied,
    (c) means forming a shoulder on said traction elements spaced from the periphery of said central body unit and fixed radially with respect to the center of said body unit, and
    (d) means to locate said traction elements on said wheel in substantially equal circumferential spacing comprising a chain element having links transfixed by said traction elements and lying against said shoulders, said links being connected in tension by said chain between said elements when spaced substantially equally around the wheel.

7. A traction device for application to traction wheels which comprises:
    (a) a relatively flat, central body unit,
    (b) a plurality of traction elements having a first end captive in said body but movable circumferentially and another end extending outwardly and at a direction substantially normal to the first end and movable to a position parallel with or normal to the plane of said body,
    (c) tension means positively located radially on said first ends to operatively connect said respective traction elements to effect circumferential spacing thereof when applied to a wheel, and
    (d) a traction plate applicable to said other end of said traction elements comprising an L-shaped member, one leg of said L having a U-shaped cross-section embracing said other end and attached thereto, the legs of the U extending in a direction opposite to the first end of the traction element to provide ground engaging edges, and the other leg of said L extending parallel to and in the same direction as the first end and positioned to contact the outside wall of a tire.

References Cited in the file of this patent

UNITED STATES PATENTS

| | | |
|---|---|---|
| 755,841 | Brady | Mar. 29, 1904 |
| 833,808 | True | Oct. 23, 1906 |
| 1,353,134 | Shiffer et al. | Sept. 14, 1920 |
| 2,397,277 | Lawrence | Mar. 26, 1946 |
| 2,733,748 | Cranston | Feb. 7, 1956 |
| 2,746,508 | Doughty | May 22, 1956 |
| 2,767,761 | O'Higgins | Oct. 23, 1956 |
| 2,806,503 | Hamerski | Sept. 17, 1957 |